April 28, 1936. M. HOKANSON Re. 19,948

REFRIGERATOR

Original Filed March 19, 1931 2 Sheets-Sheet 1

Inventor

Martin Hokanson.

By Geo. Stevens

Attorney

April 28, 1936. M. HOKANSON Re. 19,948

REFRIGERATOR

Original Filed March 19, 1931 2 Sheets-Sheet 2

Inventor

Martin Hokanson.

By Geo. Stevens.

Attorney

Reissued Apr. 28, 1936 Re. 19,948

UNITED STATES PATENT OFFICE 19,948

REFRIGERATOR

Martin Hokanson, Duluth, Minn., assignor to Eidco, Inc., Duluth, Minn., a corporation of Minnesota Original No. 1,961,361, dated June 5, 1934, Serial No. 523,782, March 19, 1931. Application for reissue April 20, 1935, Serial No. 17,549

23 Claims. (Cl. 62—46)

This invention relates to refrigerators, and has special reference to a type of refrigerator commonly used for household purposes and wherein ice is used as the refrigerant.

The principal object is to produce a practical and efficient device of this character.

Another object is to produce a novel form of ice rack and drip pan whereby to insure even melting of the ice from the under side only in such a manner that the top surface of the ice cake will remain practically parallel with the bottom surface during the melting of the ice cake; this for the purpose of providing maximum uniform space above same for additional refrigerant as supplied from time to time.

Still another object is to provide means whereby to present proper moist area for contact with the air in circulation.

A further object of the invention is to provide a refrigerator having an ice rack composed wholly of copper, which metal provides the maximum thermal conductivity.

Another object is to provide a refrigerator in which the temperature within the food compartment is maintained in the most optimum condition irrespective of the ice volume employed.

Another object is to provide a refrigerator having sufficient and constant humidity therein.

Another object is to provide a refrigerator having the maximum area and uniformly distributed drippage from the refrigerant for washing the air and thus producing a cleaner air, free from odor.

Another object is to provide increased circulation of air in the box, thus producing a lower working temperature.

Still other objects and advantages of the invention will appear in the following description thereof.

Referring now to the accompanying drawings, forming part of this application, and wherein like reference characters indicate like parts.

Figure 2:
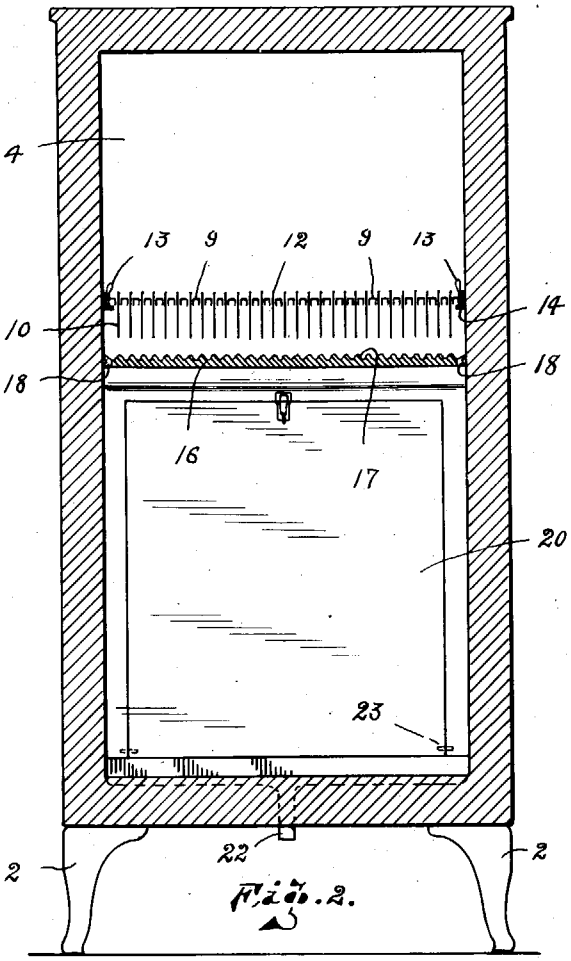
Figure 2 is a similar view taken at right angles to Figure 1.
Figure 1:
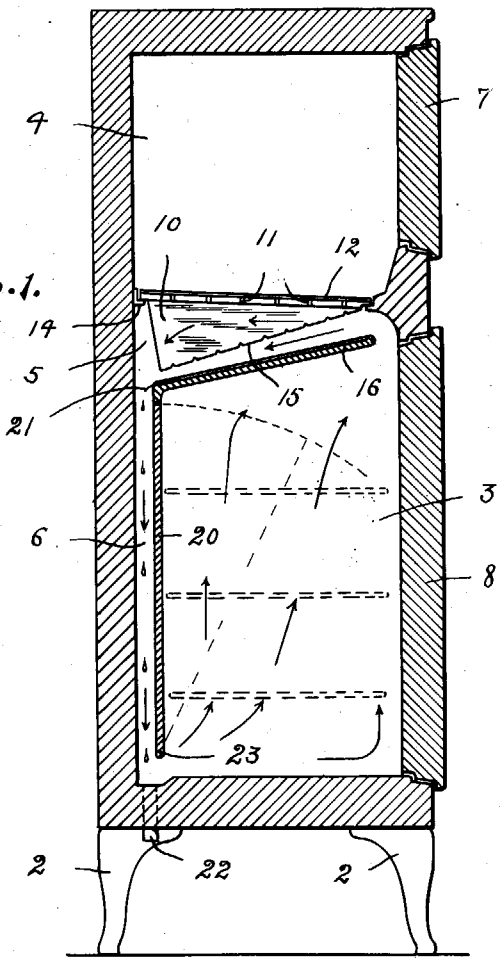
Figure 1 is a vertical transverse section through approximately the center of the refrigerator embodying the invention.
Figure 3:
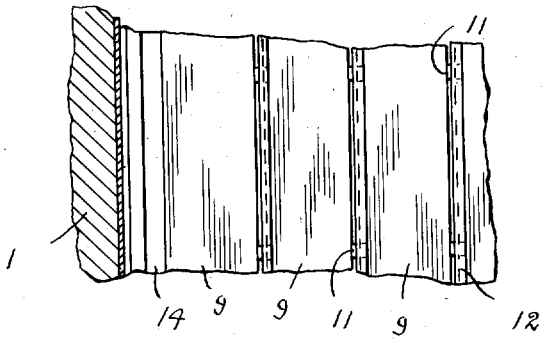
Figure 3 is a fragmental portion of an enlarged plan view of the ice rack.
Figure 4:
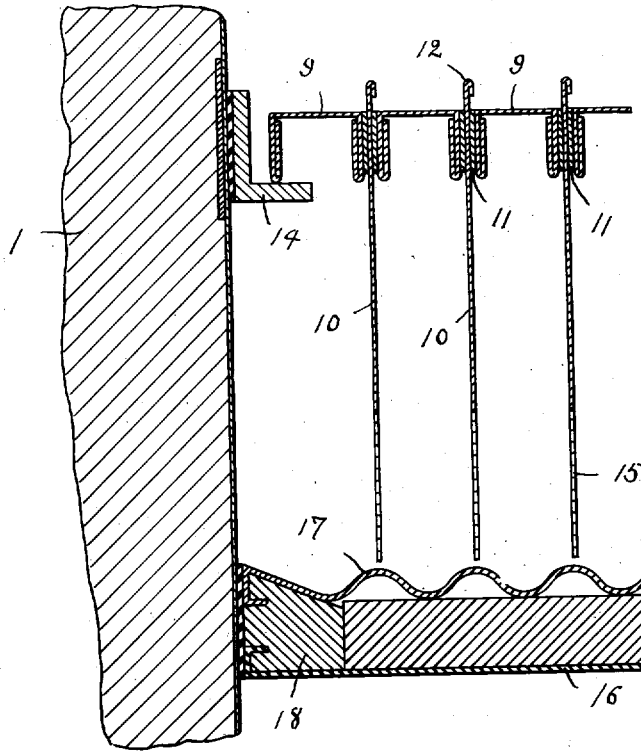
Figure 4 is an enlarged vertical sectional view of Figure 3, and fragmental end elevation.
Figure 4:
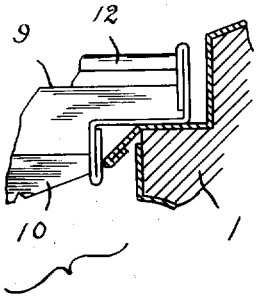
Figure 5:
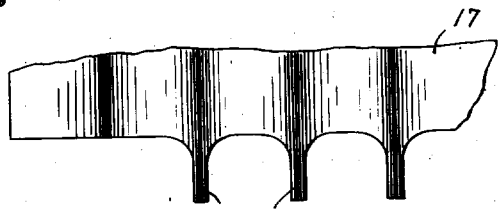
Figure 5 is a top plan view of a portion of the lower end of the drip pan.

The invention contemplates the well known principle in refrigeration of exposing only the lower surface of the refrigerant to the circulating air within the refrigerator, and, combining with that principle the novel arrangement of utilizing the products of melting ice in augmenting the circulation of air within the refrigerator.

1 represents the walls of the refrigerator which may be of any desired insulated construction, preferably mounted upon suitable legs indicated at 2, and the interior of the refrigerator is divided as is customary into two major compartments, including the food compartment 3 and ice compartment 4, together, in this instance, with a condensation and cooling compartment 5—6; this latter being in direct communication with the food compartment 3 but normally out of communication with the ice compartment 4.

A door 7 is provided in the usual manner for the ice compartment, and the door 8 for the food compartment. A removable rack is provided for the ice compartment and which preferably inclines slightly downwardly towards the front of the refrigerator, so that the ice cake will normally seek the front of the refrigerator. This rack is novel in that it is of fabricated metal construction throughout, preferably of sheet copper due to its high thermal conductivity, and is formed in a manner to provide the maximum surface for contacting the air circulating through the horizontal portion 5 of the condensing chamber and for conveying moisture from the melting ice.

This rack comprises the inverted U-shaped strips of metal indicated at 9, their depending flanges being doubled inwardly upon themselves forming two thicknesses of the metal the entire length thereof, for strength, and intermediate of each U strip are depending drip fins or baffles 10 of the same metal, they being spaced from the adjacent side walls of the U strips by narrow vertical strip-like spacers indicated at 11, thus forming comparatively deep limbers the entire length of the rack, except where the spacers occur, which limbers are constantly full of water by capillary action, thus preventing air circulation therethrough. The upper edges of the fins or baffles 10 extending above the plane of the upper surface of the U strips 9, are turned downwardly against themselves, thus forming a reinforced double thickness bead 12 the entire length thereof upon which the ice is designed to rest, and prevents the ice cake from moving laterally thereupon.

The fins and strips of the ice rack extend from back to front of the refrigerator and at the sides thereof are provided with suitable handles indicated at 13 so that the rack may be readily transferred to and from its angle supports 14 fixed to the inner side walls of the ice compartment.

The fins 10 are of triangular shape as viewed from the sides thereof and provided with notched or tooth-like lower edges shown at 15 to prevent water running the entire length thereof and dripping only from the lowermost corners, thus having far superior washing and cooling effect and keeping the drip pan wet over its entire area, and, being of the shape above described, their depth at the back of the refrigerator is materially greater than at the front. In fact they have practically no depth at the front ends thereof, and the depth of fins at the rear are designed to compensate for the relative lack of melting properties of the air at that point.

Beneath the fins, and spaced therefrom, is the drip pan illustrated broadly at 16, it being of considerably greater angle than the ice rack and disposed downwardly from the front of the refrigerator so as to carry water towards the back thereof. The upper surface of this drip pan 16 is of corrugated metal as illustrated at 17, terminating in the frame member 18 and insulated from the side walls of the refrigerator to which it it attached. The bottom of the drip pan is faced with flat sheet metal, also terminating in the frame member, but spaced from the terminus of the upper member, and forming a space intermediate of the top and bottom, which space is insulated by being filled with suitable insulation material 19, preferably wrapped in oiled paper or waterproofed in some other manner. The corrugations of the upper surface 17 are arranged so that the upper convex portion of each corrugation occurs directly beneath the lower edge of each of the depending fins 10, though, as before stated, spaced therefrom so that the drippings from the various tooth-like serrations of the fins will spread uniformly thereover. The lower edge of the upper corrugated surface of the drip pan is peculiar in that it projects in saw-tooth like form over the edge of the vertical partition wall 20 of the food compartment which forms a continuation of the rearmost vertical edge of the drip pan 16. The lower edge of the partition 20 is spaced from the bottom of the refrigerator, thereby forming an air circulating opening between the bottom of the space 6 and the food compartment. That is to say, the valleys or concaved portions of the member 17 extend outwardly over the edge of the partition 20, forming a plurality of tooth-like projections 21 carrying the water as it runs down the valleys out onto the ends of these teeth or fingers from where it drops vertically through the space 6 of the condensation compartment, increasing downward air circulation therein and striking the bottom of the refrigerator adjacent said air circulating opening into the food compartment and splash, thereby washing, deodorizing, and humidifying the circulating air, and eventually discharges into the drain outlet 22.

It will be noted that the partition 20 is pivotally supported as at 23, and a suitable latch provided at 24 for holding it in position when upright, thus providing means whereby the partition may be dropped forwardly or removed entirely for cleansing purposes.

By this construction it is apparent that the ice in the ice compartment is not engaged directly by the air circulating through and about the food compartment, and that greater area is given the baffles or fins in the chamber 5 at the rearmost portion thereof to compensate for the higher temperature of the air at the forward end of the rack where more rapid circulation of air exists, thus causing the ice above the rack to melt uniformly across the lower surface thereof. By this novel construction of rack, as little air as possible contacts the ice, and that practically no circulation of air whatever occurs between the ice and food compartments.

It is well known that different degrees of humidity are desired for different food products, and while a relative humidity of sixty to sixty-five percent is commonly considered most desirable for some classes of products a different percentage of moisture may be desired for other products, and to vary which it is to be understood that the length of the capillary limbers may be varied by the width of the spacers 11, or some other means of lengthening or shortening these limbers may be resorted to, thereby increasing or decreasing the area of moist surface brought in contact with the air.

Furthermore the air passing through the cooling compartment 5—6 is not only washed and cooled by constant contact with the largest area possible of moistened surface, but is also augmented in its downward passage through the portion 6 of said chamber by the somewhat confined drippings from the fingers 21 longitudinally of the upper entrance to such passage which rapidly gravitate therethrough, and that the greatest distance possible within the food compartment between the discharge from and entrance to the cooling compartment exists, which, together with the inclination of the ceiling of such compartment, insures the best possible circulation therein and avoids any stagnant pockets of air whatsoever therein.

It will also be noted that by this construction due to the absence of the air circulating in direct contact with the ice, the cooling influence being derived only from beneath same, uniform results are accomplished in the matter of temperature; that is to say, to a larger degree than heretofore known the uniform temperature in the food chamber is maintained irrespective of the volume of ice in the refrigerant chamber. In other words, as long as there is any ice whatever in the ice compartment the temperature of the baffles will be approximately equal to that of the ice, and that since the area of the baffles presented to the circulating air to be cooled is approximately three times the average area of the ice cake, it follows that the cooling influence of the ice is multiplied three fold.

Having thus described my invention, what I claim and desire to secure by Letters Patent, is:

1. A refrigerator having a food chamber, a cooling and humidifying chamber and a refrigerant chamber, a fabricated rack for the refrigerant composed of a plurality of depending spaced baffles cooperatively connected with reinforcing spaced strips, said baffles extending within the cooling and humidifying chamber whereby to augment cooling and humidifying in said chamber.

2. A refrigerator having a food chamber, a condensing chamber and a refrigerant chamber, having a rack for the refrigerant including a plurality of spaced depending baffles the lowermost edge of which is serrated for the purpose described.

3. A refrigerator having a food chamber, a combined back wall and drip pan extending from side to side of the refrigerator and spaced from the rear wall of the refrigerator, and the lower edge of said back wall being spaced from the bottom of the food compartment, and means for causing the drip from the drip pan to be evenly distributed horizontally as it falls through the space between the back wall and rear wall.

4. A refrigerator having a food chamber and a refrigerant chamber, a refrigerant rack and drip pan inclined in opposite directions intermediate of said compartments, and spaced baffles having serrated lower edges depending from said rack for the purpose described.

5. A refrigerator having a food chamber and a refrigerant chamber, a refrigerant rack and drip pan intermediate of said compartments and spaced baffles having serrated lower edges depending from said rack, the rear edge of the drip pan being formed with a plurality of spaced drip teeth for the purpose described.

6. A refrigerator comprising a food compartment and a refrigerant compartment, a combined drip pan and rear wall within the food compartment and extending from side to side of said compartment but spaced from all other walls of the refrigerator, and means to cause the drip from the refrigerant to fall equally over the entire drip pan, said drip pan having projections extending into the space between the rear wall of the food compartment and back of the refrigerator.

7. A refrigerator comprising a food compartment and a refrigerant compartment, and a combined drip pan and rear wall within the food compartment and extending from side to side of said compartment but spaced from all other walls of the refrigerator said drip pan having horizontally spaced projections extending into the space between the back of the refrigerator and rear wall of food compartment, whereby the air is caused to circulate through the drip from the refrigerant during at least half its course of circulation.

8. The combination with a refrigerator having a refrigerant chamber and condensing chamber, of a fabricated sheet metal refrigerant rack, a plurality of spaced limbers through said rack automatically closed by capillary action and associated with depending baffles within the condensing chamber to insure constant gravitation of moisture from the refrigerant without air from the condensing chamber contacting the refrigerant.

9. A refrigerator of the type described comprising a refrigerant compartment, a food compartment, and a fabricated sheet metal refrigerant rack having limbers therein sealed by capillary action of the refrigerant and thereby preventing any circulation of air between said compartments.

10. A refrigerator of the type described comprising a refrigerant compartment, a food compartment, a condensation compartment, and a drip pan having horizontally spaced means projecting within the condensation compartment for causing uniform distribution of the drip therefrom throughout the condensation compartment.

11. An ice rack comprising a plurality of inverted U-shaped strips, and a baffle fixed intermediate of each pair of said strips, said baffles extending above and below said strips.

12. An ice rack for refrigerators comprising a plurality of ice supporting members, and a flat conductor baffle of gradually increasing depth toward one end fixed to and intermediate of each pair of supporting members forming a normally closed ice rack.

13. An ice rack for refrigerators comprising a plurality of ice supporting members, and a substantially flat triangularly shaped baffle fixed to and intermediate of each pair of supporting members and projecting therebelow.

14. In a refrigerator having an ice compartment and a food compartment, the combination of an ice rack adapted to prevent circulation of air between said compartments comprising a plurality of ice supporting members, and a flat conductor baffle fixed to and intermediate of each pair of supporting members but at intervals slightly spaced therefrom.

15. In a refrigerator having a food compartment, a solid partition spaced from the rear wall of the refrigerator and forming the rear wall of the food compartment, and a drip pan having a series of troughs projecting over said partition to cause drip from a refrigerant to fall free from the partition and rear wall of the refrigerator, to the bottom thereof to increase circulation of air in the food compartment.

16. A fabricated sheet metal ice rack for refrigerators comprising a plurality of parallel and alternately arranged inverted U-shaped ice supporting members and conductor baffles secured together and extending from front to back of the rack each baffle being intermediate of a pair of supporting members and spaced slightly therefrom.

17. A fabricated sheet metal ice rack for refrigerators comprising a plurality of substantially contiguous ice supporting members, and a flat sheet metal conductor baffle intermediate of each pair of supporting members and to which said members are fixed.

18. A fabricated sheet metal ice rack for refrigerators comprising a plurality of substantially contiguous ice supporting members, and a flat sheet metal conductor baffle intermediate of each pair of supporting members and to which said members are fixed, the lower edges of said baffles extending below the supporting members and being inclined to the plane of their upper edges.

19. An ice rack for refrigerators comprising a plurality of alternately arranged ice supporting members and flat baffles engaging and being fixed to each other and forming a substantially closed rack.

20. A unitary substantially closed ice rack for refrigerators comprising a plurality of parallel inverted U-shaped members spaced from each other and a flat depending member intermediate of and fixed to each pair of said U-shaped members and at intervals slightly spaced therefrom for the purpose described.

21. In a refrigerator having an ice compartment, an ice rack, a combined drip pan and vertical partition spaced from the ice rack and back wall of the refrigerator and forming an air circulation flue between the rack and pan, and partition and back wall, said drip pan being inclined toward and having means projecting over said partition to cause drip from a refrigerant to fall free from the partition and rear wall of the refrigerator to the bottom thereof to increase air circulation in said flue.

22. The combination with a refrigerator having a confined unobstructed vertically disposed air circulating space therein extending to the bottom of the refrigerator of a series of troughs projecting over the space for causing drip water to be discharged centrally over said space so that it will fall free from the walls of the refrigerator to the bottom thereof and augment downward circulation of air therein.

23. In a refrigerator having a food compartment therein, a combined drip pan and division wall forming the top and back of the food compartment, said division wall portion including marginal walls fixed to the sides of the refrigerator and a baffle removably pivoted to said marginal walls.

MARTIN HOKANSON.